United States Patent [19]

Abel et al.

[11] Patent Number: 5,563,193

[45] Date of Patent: Oct. 8, 1996

[54] LOW SOLVENT, THERMOPLASTIC POLYURETHANE CONTAINING SOLVENT CEMENT

[75] Inventors: Ulrich Abel, Schifferstadt, Germany; Lawrence E. James, Grosse Ile; Mark W. Waldrop, Royal Oak, both of Mich.

[73] Assignee: BASF Corporation, Mt. Olive, N.J.

[21] Appl. No.: 592,742

[22] Filed: Jan. 25, 1996

Related U.S. Application Data

[62] Division of Ser. No. 400,738, Mar. 8, 1995.

[51] Int. Cl.$^6$ .............................. C08J 3/00; C08K 3/20; C08L 75/00; B32B 27/00
[52] U.S. Cl. ............... 524/86; 156/308.6; 156/331.7; 524/94; 524/99; 524/107; 524/110; 524/111; 524/113; 524/589; 428/423.1; 428/424.6
[58] Field of Search ................... 156/155, 308.6, 156/331.7; 524/589, 86, 94, 99, 107, 110, 111, 113; 428/423.1, 424.6

[56] References Cited

U.S. PATENT DOCUMENTS

| | | | |
|---|---|---|---|
| 3,494,494 | 2/1970 | Matsubayashi et al. | 264/184 |
| 3,806,486 | 4/1974 | Endriss et al. | 260/31.2 N |
| 3,887,757 | 6/1975 | Stone et al. | 428/425 |
| 4,007,070 | 2/1977 | Busdiecker | 156/143 |
| 4,672,084 | 6/1987 | Dierdorf et al. | 524/113 |
| 4,675,354 | 6/1987 | Sperling | 524/99 |
| 4,687,798 | 8/1987 | King, Sr. | 524/100 |
| 4,822,827 | 4/1989 | Bork et al. | 521/170 |
| 4,874,858 | 10/1989 | Magistro | 544/196 |
| 4,975,207 | 12/1990 | Lee | 524/494 |
| 5,010,120 | 4/1991 | Sugiura | 523/219 |
| 5,017,629 | 5/1991 | Wilson et al. | 523/219 |
| 5,047,451 | 9/1991 | Barrett et al. | 523/442 |
| 5,252,634 | 10/1993 | Patel et al. | 523/218 |

FOREIGN PATENT DOCUMENTS 0140118  5/1985  European Pat. Off. .

*Primary Examiner*—Paul R. Michl
*Assistant Examiner*—Patrick Niland
*Attorney, Agent, or Firm*—Paul L. Marshall

[57] ABSTRACT

There is now provided a solvent cement having a total of less than 80 weight percent of solvents and a thermoplastic polyurethane elastomer as at least one of the resins dissolved in the solvent. The solvent mixture contains at least a 5- or 6-membered water miscible lactone or lactam such as N-methyl-2-pyrrolidone (NMP) in an amount of 21 weight percent or less based on the weight of all the ingredients. The reduced solvent concentration assists in lowering VOC emissions while preserving the hydrostatic burst strength mechanical property required by ASTM D 2564-88.

16 Claims, No Drawings

LOW SOLVENT, THERMOPLASTIC POLYURETHANE CONTAINING SOLVENT CEMENT

This is a divisional of application Ser. No. 08/400,738, filed Mar. 8, 1995, pending.

FIELD OF THE INVENTION

The present invention relates to solvent based adhesives for bonding water insoluble synthetic organic polymers. More specifically, the present invention relates to a solvent based cement employing a thermoplastic polyurethane elastomer and as one of the solvent ingredients, less than 21 weight percent of N-methyl-2-pyrrolidone, with the total amount of solvent being less than 80 weight percent, each amount being based on the weight of the solvent based cement.

BACKGROUND OF THE INVENTION

Solvent based cements have long been used to bond together thermoplastic pipe fittings. The solvent based cement may be broadly divided into at least two categories: the solvent, and the resin or dopant. The solvent acts to partially solvate and swell the pipe or other substrate to be bonded. After a period of time, the cement cures by evaporation of solvents from the pipe or other substrate into the atmosphere. The resin dissolved in the adhesive dries upon cure into the surface irregularities caused by the solvent, thus providing a strong, tight, leakproof joint.

A typical solvent based cement comprises a thermoplastic resin, usually the same type of resin as the substrates to be adhered, such as PVC, CPVC, and ABS, and a small group of solvents approved by the National Sanitation Foundation (NSF) for use in potable water pipe systems which transport water for drinking; drain, waste and vent (DWV) in homes and industry; turf and sprinkler systems; and jacuzzis, spas, and tubs. The group of approved solvents are:

a) methyl ethyl ketone;
b) tetrahydrofuran;
c) dimethyl formamide;
d) acetone;
e) cyclohexanone; and,
f) N-methyl-2-pyrrolidone.

Efforts have been underway to reduce the amount of solvents evaporated into the atmosphere to control air pollution, reduce fire hazards, and reduce potential occupational hazards. For example, the South Coast Air Quality Management Division (SDAQMD) has issued Rule 1168 which provides limits to volatile organic compound (VOC) emissions. In PVC or CPVC based cements, the VOC emissions were to have been reduced from the then existing 850 g/l level to 450 g/l by Jan. 1, 1994, and further to 250 g/l by Jan. 1, 1198.

Early efforts to reduce VOC emissions from cements focused on merely increasing the levels of thermoplastic resin, such as PVC or ABS, while simultaneously decreasing the amount of solvent. The maximum concentration of PVC in cements using the NSF approved solvents has been at an upper limit of around 14 weight percent because greater amounts of resin dissolve only with great difficulty. Further, in order to comply with ASTM 2564-88, PVC solvent cements must be capable of dissolving at least 3 weight percent of additional PVC at 23° C. without signs of gelation. At amounts greater than 14 weight percent, PVC usually begins to show signs of gelation when 3 weight percent more PVC is added in typical solvent formulations.

U.S. Pat. No. 5, 252,634 describes hollow, silica-aluminum alloys known as Zeelon Z-Light spheres, mixed with PVC, CPVC, or ABS solvents cements to increase the solids content while reducing the VOC volume. It would be desirable, however, to formulate a solvent based cement without having to use additives which would increase the cost of the cement. U.S. Pat. No. 4,675,354 proposes adding N-methyl-2-pyrrolidone as essentially the sole solvent in a PVC, ABS, polyacrylate, polycarbonate, cellulose acetate, polyacrylamide, polyamide, or polystyrene based cements to reduce VOC emissions, flammability, and occupational hazards. U.S. Pat. No. 4,687,798 proposes a combination of a lactam such as N-methyl-2-pyrrolidone with an alkanol or an ester of an alkanoic acid as a solvent system using the aforementioned resins as the dopant. This patent reports that the cement using the solvent combination meets or exceeds ASTM lap shear strength requirements. Also described in EP 140188 is a removable coating on the surface of vehicle tires where the coating is made of a thermoplastic polyurethane elastomer dissolved in, for example, 70 to 90 weight percent of N-methyl-2-pyrrolidone. We have found, however, that solvent cements having the described large quantities of N-methyl-2-pyrrolidone fail to satisfy the hydrostatic burst strength requirements Under ASTM D-2564.

SUMMARY OF THE INVENTION

It is an object of the invention to provide a solvent cement with reduced VOC emissions. It is also an object of the invention to provide a solvent cement which meets the hydrostatic burst strength requirements of ASTM D-2554-88 so as to provide a strong bond to pipe fittings.

The present invention provides a solvent cement having a total amount of solvent(s) of less than 80 weight percent and an increased dissolved thermoplastic resin concentration comprising a thermoplastic polyurethane elastomer (TPU). By increasing the dissolved resin concentration, the amount of solvent concentration is reduced which in turn helps reduce VOC emissions. Further, the solvent comprises a five or six cyclic membered water miscible lactone or lactam, preferably N-methyl-2-pyrrolidone, which possesses excellent solvating action on TPU's, but in an amount of less than 21 weight percent in order to provide the burst strength necessary to pass ASTM 2654-88.

DETAILED DESCRIPTION OF THE INVENTION

The solvent cement comprises a thermoplastic polyurethane elastomer as at least one of the resins dissolved in the solvent. A thermoplastic polyurethane elastomer as a resin provides a strong water-tight bond of a variety of water insoluble synthetic substrates, including PVC and ABS. The amount of thermoplastic polyurethane elastomer dissolved in the solvent is dependent upon the desired viscosity balanced against the reduction in the amount of volatile solvents one desires to use. While typical PVC-based solvent cements can only dissolve up to 14 weight percent PVC without gelling at +3 more weight percent, we have found that 20 weight percent or more of thermoplastic polyurethane elastomers can be dissolved in the solvent or mixture of solvents of the invention without signs of gelling when three more weight percent is added at 23° C. according to ASTM D 2564-88. While from 20 weight percent to 40 weight percent of the thermoplastic polyurethane elastomer can be dissolved in the solvent used in the invention, it is preferred to employ from 20 weight percent to 30 weight percent, and more preferably from 25 weight percent to 29 weight percent, of the thermoplastic polyurethane elastomer in view of what appears to be an exponential increase in viscosity as more of the elastomer is added. The viscosity of the solvent cement is desirably under 30,000 cP at 23°+/− 0.5° C. and 1 atmosphere, more preferably under 10,000 cP, and most preferably 1,500 cP or less.

The thermoplastic polyurethane elastomer is preferably the principal resin. Other thermoplastic resins, however may be co-dissolved in any proportion along with the polyurethane elastomer, such as PVC, CPVC, ABS, polyacrylate, polycarbonate, cellulose acetate, polyacrylamide, polyamide, polyacrylamide, and polystyrene, with PVC and ABS being preferred due to their widespread use and availability.

The thermoplastic polyurethane elastomer and other thermoplastics may be added to the solvent in any form, including polymer scrap, recycled or recovered thermoplastic polymers, or freshly made thermoplastic polymers in the form of chips, pellets, strands, fiber, or powder. The TPU is made by reacting (a) an organic polyisocyanate having 2 or more, and preferably only two, isocyanate groups with a (b) compound having at least two, and preferably only two, isocyanate reactive hydrogen atoms and a (c) chain extender, optionally in the presence of (d) catalysts, and (e) assistants.

The TPU may be prepared by the belt or the extrusion process. In the belt process, components (a) to (c) and, if required, (d) and/or (e) are mixed continuously above the melting point of components (a) to (c) with the aid of a mixing head. The reaction mixture is applied to a carrier, preferably a conveyor belt, and is fed through a heated zone. The reaction temperature in this zone is from 60° to 200° C., preferably 100° to 180° C.

When the reaction is complete, the TPU is allowed to cool and is comminuted or granulated and stored temporarily or compounded directly with the additives.

In the extrusion process, the reactor may be a separate unit or a part of the extruder, configured or designed to conduct the initial polymerization. The polymer reactants (a) to (c), and if required, (d) and (e), are added individually or as a mixture to the reactor portion of the apparatus where polymerization begins. The reaction is carried out generally at 100° C. to 250° C., and an increase in the reaction mixture viscosity indicates the degree to which polymerization is complete. The reacting mixture is passed into the extruder portion of the apparatus during which time the polymerization reaction is completed before the polymer resin exits through the extruder die. As in any conventional extrusion process, the resin is subjected to high shear mixing forces as it passes down the extruder. The resultant TPU is allowed to cool, is granulated, or further processed by compounding with other additives, fillers, or reinforcements.

A typical compounding process involves feeding a solid polymer such as the TPU in granulated form into another extrusion apparatus equipped with a screw device. The polymer is heated and melted and additives, fillers and/or reinforcements are added as it is passed along the length of the screw. For TPU, the temperature is typically between 180° C. and 240° C. Any quantity of solid TPU may be used depending upon the desired end volume of the pellet. The action of the screw disperses and evenly distributes the added ingredients into the polymer matrix, constantly exerting high shear forces upon the ingredients. The resultant composite exits the apparatus by extrusion through a die and is then cooled and pelletized.

Any conventional extruder apparatus permitting compounding of the resin with the particulate additives can be used. Suitable designs are those having a single screw, twin screw, or a modified screw configuration, preferably those having a co-rotating and self cleaning design. Commercially available and suitable apparatus include a Werner-Pfleiderer co-rotating intermeshing twin screw model, and a Welding Engineers unit with a counter-rotating, non-intermeshing, twin screw design from Welding Engineers, Inc., Blue Bell, Pa., U.S.A. Single screw extruders are available from Bersdorff in Charlotte, N.C., U.S.A. Suitable results can also be achieved with a Buss Kneader available from Buss America, Elk Grove, Ill., U.S.A.

The compounded TPU pellets or the granulated TPU from the reactor extruder or the belt conveyor may be added in solid form at room temperature to the solvent and stirred or agitated until the thermoplastic pellets are dissolved and a homogenous solution is obtained. Depending upon the type and amount of granulate or pellets added, homogenization may require 0.5 to 4 hours of agitation. Furthermore, more than one type of thermoplastic minipellet may be added to the solvent, such as the aforementioned CPVC, PVC, ABS, etc. A suitable mixture of thermoplastic should be storage stable without phase separation after 24 hours and easily form a homogenous mixture upon shaking by hand thereafter.

In some cases, one or more of the solvents may prevent a thermoplastic polymer from dissolving or dispersing. For example, we have found that a dispersion grade PVC agglomerates when added to a solvent mixture containing N-methyl-2-pyrrolidone. Therefore, the thermoplastic polymer should first-be added to solvents which dissolve or disperse the thermoplastic with subsequent addition of the remaining solvent.

In manufacturing the TPU, it is possible to proceed with the "one shot technique" or the prepolymer technique. In the "one shot" process, each of the individual ingredients (a) to (c) and optionally (d) and (e) are brought into contact in the reaction chamber, although the ingredients (b) to (c) and, if used, (d) and (e) may be premixed prior to introduction into the reaction chamber. On the other hand, the prepolymer technique requires pre-reacting a portion of the organic isocyanate (a) with a polyol (b) in a first step, to form a prepolymer, and subsequently reacting the prepolymer with any remaining polyol (b) and the chain extending agent (c).

Suitable organic isocyanates (a) include any of the known aliphatic, cycloaliphatic, araliphatic and aromatic diisocyanates and polyisocyanates, preferably the diisocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethyl-cyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a number average molecular weight of up to 2000, or mixtures thereof; modified 4,4'-diphenylmethane diisocyanate or 2,4- add 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

While polyisocyanates can be introduced in minor amounts, it is preferred that only diisocyanates are used to reduce crosslinking and preserve the thermoplasticity of the resultant polymer.

The polyols (b) which can be employed are polyhydroxyl compounds having a nominal functionality of 2 to 8, more preferably 2 to 3, and an average hydroxyl number of 15 to 850, more preferably 20 to 150. Polyols having hydroxyl numbers outside this range may be used, but it is preferred that the average hydroxyl number for the total amount of polyols used fall within the range of 20 to 150. The number average molecular weight may range from 750 to 10,000, and is preferably from 1,000 to 6,000.

Examples include polythioether polyols, polyester amides and polyacetals containing hydroxyl groups, aliphatic polycarbonates containing hydroxyl groups, amine terminated polyoxyalkylene polyethers, and preferably, polyester polyols and polyoxyalkylene polyether polyols. In addition, mixtures of at least two of the aforesaid polyols can be used as long as the combination has an average hydroxyl number in the aforesaid range.

The term "polyester polyol" as used in this specification and claims includes any minor amounts of unreacted polyol remaining after the preparation of the polyester polyol and/or unesterified polyol (e.g., glycol) added after the preparation of the polyester polyol. The polyester polyol can include up to about 40 weight percent free glycol.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di- esters of alcohols with 1 to 4 carbons, or dicarboxylic acid anhydrides. Dicarboxylic acid mixtures of succinic acid, glutaric acid and adipic acid in quantity ratios of 20–35:35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., $\epsilon$-caprolactone or hydroxycarboxylic acids, e.g., $\omega$-hydroxycaproic acid, may also be used.

The polyester polyols can be produced by polycondensation of organic polycarboxylic adds, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for azeotropic distillation of the water of condensation.

To produce the polyester polyols, the organic polycarboxylic acids and/or derivatives thereof and multivalent alcohols are preferably polycondensed in a mole ratio of 1:1–1.8, more preferably 1:1.05–1:2.

After transesterification or esterification, the reaction product can be reacted with an alkylene oxide to form a polyester polyol mixture. This reaction desirably is catalyzed. The temperature of this process should be from about 80° to 170° C., and the pressure should generally range from about 1 to 40 atmospheres.

While the aromatic polyester polyols can be prepared from substantially pure reactant materials, more complex ingredients are advantageously used, such as the side stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Polyester polyols whose acid component advantageously comprises at least about 30 percent by weight of phthalic acid residues be useful. By phthalic acid residue is meant the group:

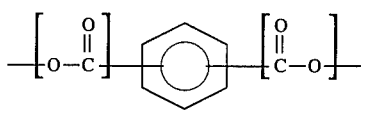

An example of a polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other materials containing phthalic acid residues are polyalkylene terephthalates, like polyethylene terephthalate (PET), residues or scraps.

Still other residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate® 101. DMT process residues having a different composition but still containing the aromatic esters and acids are also sold by DuPont and others. The DMT process residues to be transesterified in accordance with the present invention preferably have a functionality of 2 to 3. Such suitable residues include those disclosed in U.S. Pat. Nos. 3,647,759; 4,411,949; 4,714,717; and 4,897,429; the disclosures of which with respect to the residues are hereby incorporated by reference.

Polyoxyalkylene polyether polyols, which can be obtained by known methods, are also preferred for use as the polyhydroxyl compounds. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 2 to 3, reactive hydrogen or by cationic polymerization with Lewis acids such as antimony pentachloride, boron trifluoride etherate, etc., or bleaching earth as catalysts from one or more cyclic ethers or alkylene oxides (oxiranes which are substituted or unsubstituted) with 2 to 4 carbons in the alkylene radical.

Suitable cyclic ethers and alkylene oxides include, for example, tetrahydrofuran, 1,3-propylene oxide, 1,2- and 2,3-butylene oxide, styrene oxide, and preferably ethylene oxide and 1,2-propylene oxide. The cyclic ethers and alkylene oxides may be used individually, in alternation, one after the other or as a mixture. Examples of suitable initiator molecules include water, organic dicarboxylic acids such as succinic acid, adipic acid, phthalic acid and terephthalic acid.

A suitable polyhydric alcohol may be used such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Suitable organic amine starting materials include aliphatic and cycloaliphatic amines and mixtures thereof, having at least one primary amino group, preferably two or more primary amino groups, and most preferable are the diamines. Specific non-limiting examples of aliphatic amines include monoamines having 1 to 12, preferably 1 to 6 carbon atoms, such as methylamine, ethylamine, butylamine, hexylamine, octylamine, decylamine and dodecylamine; aliphatic diamines such as 1,2-diaminoethane, propylene diamine, 1,4-diaminobutane, 1,6-diaminohexane, 2,2-dimethyl-,3-propanediamine, 2-methyl-1,5-pentadiamine, 2,5-dimethyl-2,5-hexanediamine, and 4-aminomethyloctane-1,8-diamine, and amino acid-based polyamines such as lysine methyl ester, lysine aminoethyl ester and cystine dimethyl ester; cycloaliphatic monoamines of 5 to 12, preferably of 5 to 8, carbon atoms in the cycloalkyl radical, such as cyclohexylamine anti cyclo-octylamine and preferably cycloaliphatic diamines of 6 to 13 carbon atoms, such as cyclohexylenediamine, 4,4'-, 4,2'-, and 2,2'-diaminocyclohexylmethane and mixtures thereof; aromatic monoamines of 6 to 18 carbon atoms, such as aniline, benzylamine, toluidine and naphthylamine and preferably aromatic diamines of 6 to 15 carbon atoms, such as phenylenediamine, naphthylenediamine, fluorenediamine, diphenyldiamine, anthracenediamine, and preferably 2,4- and 2,6-toluenediamine and 4,4'-, 2,4'-, and 2,2'-diaminodiphenylmethane, and aromatic polyamines such as 2,4,6-triaminotoluene, mixtures of polyphenyl-polymethylene-polyamines, and mixtures of diaminidiphenylmethanes and polyphenyl-polymethylene-polyamines.

Suitable initiator molecules also include alkanolamines such as ethanolamine, diethanolamine, N-methyl- and N-ethylethanolamine, N-methyl- and N-ethyldiethanolamine and triethanolamine plus ammonia.

Included among the polyether polyols are polyoxyethylene glycol, polyoxypropylene glycol, polyoxybutylene glycol, polytetramethylene glycol, block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

The preferred group of polyols (b) are the essentially linear polyoxyalkylene polyether polyols, polyester polyols, and the polyether-ester polyols.

The chain extender (c) which may be used to make the TPU can be the sole reactant with the organic isocyanate or may be admixed with polyol (b). The chain extender (c) has a number average molecular weight of less than 500 and has at least two isocyanate reactive hydrogen. Difunctional hydroxyl extenders are preferred as a class, and most preferred are the aliphatic diols having 2 to 10 carbon atoms, inclusive of bis(hydroxyalkyl)cycloalkanes.

Illustrative of such extenders are aliphatic straight and branched chain diols having from about 2 to 10 carbon atoms, inclusive, in the chain. Such diols include ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,9-nonanediol, 2-methyloctane-1,8-diol, 1,4-cyclohexanedimethanol, hydroquinone, bis(hydroxyethyl)ether, and the like including mixtures of two or more such diols. The extenders, which can be used alone or in admixture with each other also include diethylene glycol, dipropylene glycol, tripropylene glycol, ethanolamine, N-methyl-diethanolamine, N-ethyldiethanolamine, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes of the invention are the adducts obtained by reacting an aliphatic diol or triol such as 1,4-cyclohexanedimethanol, neopentyl glycol, hexane-1,2-diol, ethylene glycol, butane-1,4-diol, trimethylolpropane and the like with ε-caprolactone in a mole ratio of from 0.01 to 2 moles of caprolactone per mole of diol or triol. Trifunctional extenders such as glycerol, trimethylolpropane and the like can also be employed in admixture with one or more of the above diols.

While any of the diol extenders described and exemplified above can be employed alone or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol, and 1,4-cyclohexanedimethanol.

Other suitable chain extenders are the cycloaliphatic chain extenders, preferably containing from 2 to 8 carbon atoms and having a number average molecular weight of less than 400. A preferred group of such cycloaliphatic extenders includes the cyclohexylene diols, the isopropylidenebis(cyclohexanols), and mixtures of these classes.

Illustrative but non-limiting of the cyclic diols are 1,3-cyclobutanediol, 1,3-cyclopentanediol, 1,2-cyclohexanediol, 1,3-cyclohexanediol, 1,4-cyclohexanediol, 2-cyhclohexene- 1,4-diol, 2-methyl-1,4-cyclohexanediol, 2-ethyl-1,4-cyclohexanediol, 1,3-cycloheptanediol, 1,4-cycloheptanediol, 2-methyl-1,4-cycloheptanediol, 4-methyl-1,3-cycloheptanediol, 1,3-cyclooctanediol, 1,4-cyclooctanediol, 1,5-cyclooctanediol, 5-methyl-1,4-cyclooctanediol, 5-ethyl-1,4-cyclooctanediol, 5-propyle-1,4-cyclooctanediol, 5-butyl-1,4-cyclooctanediol, 5-hexyl-1,4-cyclooctanediol, 5-heptyle-1,4-cyclooctanediol, 5-octyl-1,4-cyclooctanediol, and the like; 4,4'-methylenebis(cyclohexdnol), 4,4'-methylenebis(2-methylcyclohexanol), 4,4'-methylenebis(3-methylcyclohexanol), 3,3'-methylenebis(cyclohexanol), 4,4'-ethylenebis(cyclohexanol), 4,4'-propylenebis(cyclohexanol), 4,4'-butylenebis(cyclohexanol), 4,4'-isobutylenebis(cyclohexanol), 4,4'-dihydroxydicyclohexyl, 4,4'-carbonylbis(cyclohexanol),3,3'-carbonylbis(cyclohexanol),4,4'-sulfonylbis(cyclohexanol), 4,4'-oxygis(cyclohexanol), and the like; and mixtures of any of the above. Preferred of these species are those falling within the definition of cyclohexylene diols and 4,4'-isopropylidenebis(cyclohexanols).

In order to adjust the hardness and melting point of the TPU, the molar ratios of the components (b) and (c) can be varied within a relatively wide range. Molar ratios of polyol compounds (b) to chain extenders (c) of from 1:1 to 1:12, in particular from 1:1.8 to 1:6.4, have proven useful, the hardness and the melting point of the TPU increasing with increasing diol content.

The mixture of polyols (b) and chain extending agents (c) containing the hydrogen reactive with isocyanate (according to the Zerewitinoff method) preferably has a number average molecular weight lower than 500 and more preferably less than 300. The NCO/OH ratio is from 0.7 to 1.3 and preferably from 0.9 to 1.1.

For the preparation of a thermoplastic polyurethane according to the invention, a catalyst can be used although it is not absolutely necessary. One can use all the catalysts known in the art that catalyze the reaction between the isocyanic group and the compounds containing reactive hydrogen atoms.

Suitable catalysts are the known tertiary amines, e.g., triethylamine, dimethylcyclohexylamine, N-methylmorpholine, N,N'-dimethylpiperazine, 2-(dimethyylaminoethyoxy)-ethanol, diazabicyclo[2.2.2]octane and the like, and in particular organometallic compounds, such as titanic acid esters, iron compounds, e.g., iron (III) acethylacetonate, and tin compounds, e.g., tin diacetate, tin diacetate, tin dilaurate or the dialkyltin salts of aliphatic carboxylic acids, such as dibutyltin diacetate, dibutyltin dialurate or the like. The catalysts are usually employed in amounts of from 0.001 to 0.1 parts per 100 parts of polyhydroxy compound (b).

In addition to catalysts, it is also-possible for assistants (e) to be incorporated into components (a) to (c) either during formation of the TPU or compounded with granulates of TPU. Examples are lubricants, inhibitors, stabilizers to hydrolysis, light, heat or discoloration, dyes, pigments, inorganic and/or organic fillers and plasticizers.

The abovementioned assistants are described in more detail in the technical literature, for example, in the monograph by J. H. Saunders and K. C. Frisch, High Polymers, Volume XVI, Polyurethane, Part 1 and 2, Interscience Publishers 1962 and 1964, or in German Laid-Open Application DOS No. 2,901,774.

Mention may be made of heat stabilizers such as the nylons, amides of polybasic carboxylic acids, amidines, e.g., dicyanodiamide, hydrazines; ureas, poly-(N-vinyllactams) and alkaline earth metal salts of aliphatic, preferably hydroxy-containing, monobasic to tribasic carboxylic acids of 2 to 20 carbon atoms, e.g., calcium stearate, calcium ricinoleate, calcium lactate and calcium citrate. Oxidation stabilizers which may be employed are, in particular, bisphenol compounds, preferably diesters of monobasic 4-hydroxyphenylalkanoic acids of 7 to 13, preferably 7, 8, or 9, carbon atoms with diols of 2 to 6 carbon atoms. Examples of suitable light stabilizers are α-hydroxybenzophenone derivatives and benzotriazole derivatives. The stabilizers are generally used in a total amount of from 0.5 to 5, preferably from 0.5 to 3 weight percent, based on the weight of components (a) and (b).

The impact modifier may be added into the polyurethane reacting mixture either as a single component or in combination with one or more of the polyurethane forming ingredients. Alternatively and preferably, it can be admixed, preferably in comminuted form such as powder, pellets and the like, with the finished TPU also in similarly comminuted form. The resulting-physical mixture is then preferably homogenized and/or fluxed by conventional melt blending means such as by extrusion, milling, Banbury mixing, and the like. When the polyurethane plastic is being prepared using a continuous twin screw reactor extruder or like apparatus, the impact modifier may be added in any convenient manner. For example, it can be added initially with the reacting ingredients or at a later stage during polymer formation. The actual proportions are not critical provided no detrimental reductions to the heat resistance (i.e., Tg value) of the polyurethanes occurs. Advantageously, the modifier is employed within a range of from about 5 to about 30 parts by weight per hundred parts of polyurethane.

The impact modifier can be any of the polymers known in the art to enhance impact strength in various types of polymers. A particularly useful group of such modifiers comprises those which have been conventionally employed in the art to impart improved impact properties to polyvinyl chloride and related polymers; see, for example, Encyclopedia of Polymer Science and Technology, Vol. 14, pages 417–418, 1971, Interscience Publishers, New York. Illustrative of the impact modifiers are acrylonitrile-butadiene-styrene terpolymers, methyl methacrylatebutadiene-styrene terpolymers, chlorinated polyethylenes, ethylene-vinyl-acetate copolymers, vinyl chloride-ethylene-vinyl acetate copolymers, vinyl chloride-copolymers of vinyl chloride with octyl acrylate or octyl fumarate, poly(alkyl acrylates), and multi-phase composite in terpolymers based on poly-(alkyl acrylates), methacrylate-butadiene-styrene copolymer rubbers and acrylonitrile-butadiene-styrene copolymers rubbers. The multi-phase composite polymers are also recognized in the art by the term core-shell polymers. The multi-phase composite interpolymers are described in detail in U.S. Pat. No. 4,404,161 and the references cited therein, U.S. Pat. Nos. 3,808,180 and 4,096,202 disclosures of which relative to said multi-phase composite interpolymers are hereby incorporated herein by reference.

The solvent mixture employed in the solvent cement according to the invention comprises less than 21 weight percent of a 5- or 6-membered water miscible lactone or lactam, preferably having a boiling point of at least 200° C. and which remain as a liquid at 25° C. and 1 atmosphere when mixed with at least one other solvent. Such lactones and lactams have excellent solvating power when acting upon TPUs; but due to their higher boring points, lower vapor pressures, and plasticizing effect on the substrate surfaces, they evaporate slower than most other solvents.

This leads to a reduction in mechanical properties such as the hydrostatic burst strength test after two hours and lap shear strength tests after 2, 16, and 72 hours when tested according to ASTM D 2654-88. Thus, the lactone or lactam must remain at less than 21 weight percent, based on the weight of all ingredients in the solvent cement, including the TPU, in order to ensure adequate mechanical properties. Preferred amounts of the lactone or lactam, based on the weight of all ingredients, is from 10 weight percent to 16.0 weight percent, more preferably 13 weight percent to 15.0 weight percent.

Among the lactams, N-alkylated lactams, in particular N-methylated lactams are preferred, since N-alkylated lactams have lower melting points than N-unsubstituted lactams.

In the present context, the term "alkylated" designates substitution with a $C_{1-4}$ alkyl group which may be straight or branched, such as methyl, ethyl, propyl, isopropyl, butyl and tertiary-butyl. Preferred lactones are lactones which are either unsubstituted or alkylated in the 4- or 5-position. The lactams may be unsubstituted on the ring carbon atoms or alkylated in the 4- or 5-position. As examples of 5- or 6-membered water miscible lactones or lactams having a melting point at the most −10° C. and a boiling point of at least 200° C. may be mentioned N-methyl-2-pyrrolidone (also known as 1-methyl-2-pyrrolidone or NMP), butyrolactone, N,5-dimethyl-2-pyrrolidone, γ-valerolactone, γ-caprolactone.

A preferred lactam is N-methyl-2-pyrrolidone, and a preferred lactone is γ-butyrolactone. N-methyl-2-pyrrolidone is especially preferred because of its and its approved status granted by NSF as a solvent for; use on potable water pipe. We have also found that N-methyl-2-pyrrolidone easily dissolves PVC and especially polyether polyol based TPU.

Other solvents which are employed in mixture with the aforementioned lactone or lactam are at least one of methyl ethyl ketone, tetrahydrofuran, cyclohexanone, dimethyl formamide, and acetone. These solvents are preferred because they are all approved by the NSF for use in cements applied to potable water pipe.

The total amount of solvent used in the solvent cement of the invention is preferentially from 65 weight percent, but less than 80 weight percent, based on the weight of all the ingredients. Because of the good solvating power of the lactones or lactams, and in particular N-methyl-2-pyrrolidone, it is possible to dissolve 20 weight percent or more, preferably 26 weight percent to 29 weight percent, of a thermoplastic resin comprising at least TPU without signs of gelation when 3 mole weight percent of thermoplastic resin is added. The reduced solvent concentration, along with the low vapor pressure, high boiling point lactones or lactams, contributes toward reducing VOC emissions. While it is possible to use less than 65 weight percent solvent, the viscosity increases so much that the solvent cement becomes difficult to apply in piping applications. In other applications, however, a thicker solvent cement may be desirable, such as when one desires to apply floor or wall tiling, inculding PVC tiling. Highly viscous solvent cements may also be delivered through caulking guns. In piping applications, however, the more preferred method is to brush or sponge the cement on the application site. Therefore, a low viscosity cement should be used in this application.

The principal solvent preferably employed in the solvent cement of the invention is methy ethyl ketone. Based on the weight of only the solvent ingredients, the amount of methyl ethyl ketone is greater than 40 weight percent, more preferably greater than 50 weight percent, and most preferably greater than 65 weight percent. Methyl ethyl ketone has a low boiling point of about 79.6° C. and a high vapor pressure of about 75 mm Hg, and volatizes sufficiently quickly at room temperature to allow the cement to cure and meet the time limited hydrostatic burst strength requirements established under ASTM D 2564-88. Surprisingly, we found that a solvent cement employing tetrahydrofuran, which also has a low boiling point of about 66° C. and a high vapor pressure of 143 mm Hg, as the principal solvent ingredient did not produce a bond having a hydrostatic burst strength comparable to a solvent cement employing methyl ethyl ketone as the principal solvent. We found that optimal mechanical properties are obtained when the following types of solvents and solvent amounts are used, based on the weight of only the solvent ingredients: greater than 65 weight percent of methyl ethyl ketone, less than 10 weight percent of tetrahydrofuran, less than 10 weight percent of cyclohexanone, and N-methyl-2-pyrrolidone in an amount of 23 weight percent or less, and most preferably about 20 weight percent ±1 weight percent. While it is contemplated that dimethyl formamide can also be employed in this preferred list, it would not be the principal solvent due to its higher boiling point.

The composite partial pressure of the TPU solvent cements of the invention advantageously range between 80 and 150 mm Hg at 20° C.

If desired, a thixotropic agent such as colloidal silica may be incorporated in the cement according to the present invention. The colloidal silica may, for example, be of the type sold under the trademarks "Aerosil®" (from Degussa, BRD) or "HDK" (from Wacker Chemie, BRD) and may be incorporated in any suitable amounts such as from about 0.1 to about 5 weight percent, based on the weight of all the ingredients. Also, a viscosity-adjusting agent may be incorporated, such as baryte in a concentration of from 1 to 10 percent by weight, a di-2-ethylhexylamine-neutralized carboxyvinyl polymer (such as "Carbopol" 934 from Goodrich Chemicals) in a concentration of from about 0.5 to about 1 percent by weight, or a hydroxyethyl cellulose (such as "Cellosize" QP 100M from Union Carbide) in a concentration of from about 0.5 to about 2 percent by weight.

Further, a small amount of an inert metal salt may be added to assist in improving the bonding properties of the cement. For example, 1 to 2 weight percent of sodium chloride may be added.

The solvent cement of the invention is liquid and curable at 25° C. and 1 atmosphere. The solvent cement is a one component adhesive, meaning the solvent ingredients do not undergo a chemical bonding reaction with each other as would happen by the addition of a reactive second component. All of the solvents and thermoplastic resins are inert to isocyanate and polyol groups because the resin(s) added to the solvents are thermoplastic products and not the reactants or monomers of thermoplastic products.

The solvent cements of the invention not only have good hydrostatic burst strengths, but advantageously emit reduced VOC's within the limits set under SDAQMD as of Jan. 1, 1994. That is, the solvent cements of the invention have VOC levels at or below 450 g/l.

The solvent cement may be applied to bond PVC soft hoses, hard PVC fittings, or combinations thereof, ABS substrates, polyacrylates, and any of the abovementioned water insoluble polymers, but preferably for joining PVC potable water pipes. A method of bonding lies in applying the solvent cement to a substrate such as a PVC pipe, preferably after the pipe has been primed, joining the substrates, and allowing the cement to cure and develop a tight bonded joint.

EXAMPLES

The solvents and amounts listed below in Table I were added to a four-ounce jar and thoroughly mixed at ambient conditions. Elastollan® 1180A10 TPU available from BASF Corporation was added in pellet form to the solvent in the stated amount and agitated for two hours or until dissolved to form a homogenous solution. The cement solutions were tested for hydrostatic burst strength according to ASTM D 2564-88 on PVC pipes, and the results are reported in Table II below.

TABLE I

| Ingredients | Sample 1 (wt. %) | Sample 2 (wt. %) |
| --- | --- | --- |
| METHYL ETHYL KETONE | 50.00 | 51.85 |
| N-METHYL PYRROLIDONE | 14.29 | 14.81 |
| TETRAHYDROFURAN | 3.57 | 3.70 |
| CYCLOHEXANONE | 3.57 | 3.70 |
| TPU | 28.57 | 25.93 |

TABLE II

| BURST STRENGTH | SAMPLE 1 | SAMPLE 2 |
| --- | --- | --- |
| 2 HOURS | 660 psi | 810 psi |
| 24 HOURS | — | 1020 psi |
| VISCOSITY cP | 20,000 | 6,300 |

The minimum burst strength required according to ASTM D 2564-88 after two hours is 400 psi. As seen from the results, both samples which contained less than 80 weight percent solvent and from about 25 to about 29 weight percent TPU possessed good bonding strength.

What we claim is:

1. A solvent cement comprising:

a) a thermoplastic polyurethane elastomer dissolved in b) a total of less than 80 wt. % of one or more solvents; said solvent comprising a 5- or 6 membered water miscible lactone or lactam, wherein the amount of said lactone or lactam is 21 wt. % or less based on the weight of all ingredients in the cement.

2. The cement of claim 1, wherein the water miscible lactone or lactam comprises N-methyl-2-pyrrolidone in an amount of 21 wt. % or less, based on the weight of all ingredients in the cement, and wherein the total amount of the one or more solvents is from 65 wt. % to less than 80 wt. %.

3. The cement of claim 2, wherein the cement shows no signs of gelation when tested according to ASTM D 2564-88 at 23C.

4. The cement of claim 3, comprising a total of from 70 wt. % to less than 80 wt. % of the one or more solvents.

5. The cement of claim 2, wherein the amount of N-methyl-2-pyrrolidone is from 10 wt. % to 16 wt. % based on the weight of all ingredients.

6. The cement of claim 5, wherein the amount of thermoplastic polyurethane is from 25 wt. % to 29 wt. %.

7. The cement of claim 2, wherein the amount of dissolved thermoplastic polyurethane elastomer is from 20 wt. % to 30 wt. %.

8. The cement of claim 7, wherein the amount of dissolved thermoplastic polyurethane elastomer is from 25 wt. % to 29 wt. %.

9. The cement of claim 1, further comprising fumed silica as a thixotropic agent.

10. The cement of claim 2, wherein the solvent further comprises at least one member selected from the group consisting of methyl ethyl ketone, tetrahydrofuran, cyclohexanone, dimethyl formamide, and acetone.

11. The cement of claim 2, wherein the solvent further comprises greater than 40 wt. % of methyl ethyl ketone based on the weight of the solvent ingredients.

12. The cement of claim 11, wherein the amount of methyl ethyl ketone is greater than 65 wt. % based on the weight of the solvent ingredients.

13. The cement of claim 2, further comprising tetrahydrofuran in an amount of less than 10 wt. % based on the weight of the solvent ingredients.

14. The cement of claim 13, further comprising cyclohexanone in an amount of less than 10 wt. % based on the weight of the solvent ingredients.

15. The cement of claim 1, wherein the solvent consists of N-methyl-2-pyrrolidone and a solvent selected from the group consisting of methyl ethyl ketone, tetrahydrofuran, cyclohexanone, and mixtures thereof, the total amount of the solvents being from 65 wt. % to less than 80 wt. %.

16. The cement of claim 15, wherein the amount of N-methyl-2-pyrrolidone is from 10 to 16 wt. % and the amount of thermoplastic polyurethane elastomer is from 26 wt. % to 29 wt. %.

* * * * *